United States Patent [19]
Akiyama et al.

[11] Patent Number: 5,386,468
[45] Date of Patent: Jan. 31, 1995

[54] METHOD OF REGISTERING IDENTIFICATION NUMBER IN PERSONAL COMMUNICATION TERMINAL

[75] Inventors: Ryota Akiyama; Toshihiro Yabe; Kazutoshi Motohashi, all of Kawasaki, Japan

[73] Assignee: Fujitsu Limited, Kawasaki, Japan

[21] Appl. No.: 89,678

[22] Filed: Jul. 9, 1993

[30] Foreign Application Priority Data

Sep. 14, 1992 [JP] Japan .................. 4-244361

[51] Int. Cl.$^6$ .................. H04L 9/30; H04L 9/32
[52] U.S. Cl. .................. 380/25; 380/4; 380/30; 379/62
[58] Field of Search .................. 380/4, 25, 23, 24, 30; 379/62

[56] References Cited

U.S. PATENT DOCUMENTS

| | | | |
|---|---|---|---|
| 4,864,599 | 9/1989 | Saegusa et al. | 379/61 |
| 5,020,105 | 5/1991 | Rosen et al. | 380/23 |
| 5,077,790 | 12/1991 | D'Amico et al. | 380/23 |
| 5,144,667 | 9/1992 | Pogue, Jr. et al. | 380/45 |
| 5,150,412 | 9/1992 | Maru | 380/43 |
| 5,204,902 | 4/1993 | Reeds, III et al. | 380/23 |
| 5,249,230 | 9/1993 | Mihm, Jr. | 380/23 |

*Primary Examiner*—Gilberto Barrón, Jr.

[57] ABSTRACT

Prior to the sale of a personal communication terminal, a secret key is generated and stored in the personal communication terminal in accordance with an application made from the manufacturer to the carrier. At this time, the communication between the manufacturer and the carrier is performed in the form of secret communication with a signature that conforms to a public key system. After the sale, an identification number encrypted with the same key as the secret key is transmitted to the personal communication terminal in accordance with an application made from the user to the carrier. Using the stored secret key, the personal communication terminal decrypts the received identification number for storage therein.

24 Claims, 4 Drawing Sheets

METHOD OF REGISTERING IDENTIFICATION NUMBER IN PERSONAL COMMUNICATION TERMINAL

BACKGROUND OF THE INVENTION

1. Field of the Invention

The present invention relates to a method of personal communication terminal registration whereby an identification number is registered in a personal communication terminal such as a car telephone or portable telephone.

2. Description of the Related Art

When a personal communication terminal initiates voice communication, data communication, or facsimile communication via radio link provided by a carrier (communications service carrier), the personal communication terminal first transmits its identification number, and the carrier identifies the transmitted identification number as legitimate or illegitimate; if it is identified as legitimate, the communication requested is allowed to take place, at which time the carrier initiates a billing procedure to charge the user corresponding to the identification number. If this identification number is stolen by an unauthorized person and registered in an unauthorized personal communication terminal, the legitimate user could be charged for calls he actually did not make. Therefore, strict management is needed to prevent unauthorized use of the identification number.

In a system in which the user leases the personal communication terminal such as a car telephone or a portable telephone, from a carrier, the personal communication terminal is delivered to the user from the carrier with its identification number prewritten in the programmable read-only memory (PROM) or the like contained in the terminal. When the user makes a call from the personal communication terminal, the identification number is automatically transmitted so that the carrier charges the user on the basis of this identification number.

On the other hand, in a system in which such personal communication terminals are sold over the counter of a shop, the user of each personal communication terminal is not known beforehand, so that the personal communication terminals are sold with no identification number registered therein. Therefore, the user who purchased the personal communication terminal either takes the terminal to the carrier to have the identification number registered, or the shop executes the registration procedure on behalf of the carrier.

In registering the identification number in the personal communication terminal, a terminal equipment operator at the carrier or dealer keys in the identification number to write it into the programmable read-only memory (PROM) or the like contained in the personal communication terminal, and enters the identification number and associated user information into the user registration file held at the carrier. Because of the intervention of the operator or the need to enter the identification number on an application form or the like, the above procedure tends to increase the possibility of the identification number being leaked, hence increasing the chances of unauthorized use of the identification number. If the identification number is used by an unauthorized person, the legitimate user would suffer great damage, as previously described.

SUMMARY OF THE INVENTION

It is an object of the present invention to provide an identification number registration method which is capable of perfectly preventing the leakage of identification numbers.

According to the invention, there is provided a method of registering an identification number in a personal communication terminal to enable it to access communications services provided by a carrier, which comprises the steps of: storing a first key in a secret manner into the personal communication terminal prior to the sale to a user;

after the personal communication terminal has been sold to the user, transmitting to the personal communication terminal an identification number encrypted with a second key associated with the first key;

decrypting the encrypted identification number in a secret manner within the personal communication terminal by using the first key; and storing the decrypted identification number in a secret manner into the personal communication terminal.

According to the invention, there is also provided a method of storing a key into a personal communication terminal, the key being used for decrypting an encrypted identification number in order to store the identification number into the personal communication terminal to enable it to access communications services provided by a carrier, comprising the steps of:

inputting manufacture application information to manufacturer's equipment;

transmitting the input manufacture application information from the manufacturer's equipment to carrier equipment;

automatically generating the key corresponding to the manufactured information in the carrier equipment;

automatically transmitting the generated key from the carrier equipment to the manufacturer's equipment; and automatically storing the key received from the carrier equipment into the personal communication terminal, in the manufacturer's equipment.

DESCRIPTION OF THE PREFERRED EMBODIMENTS

A variety of cryptosystems are already known; they can be roughly classified into two systems, a public-key cryptosystem (asymmetric cryptosystem) and a secret-key cryptosystem or conventional cryptosystem (symmetric cryptosystem), for example. A typical example of the public-key cryptosystem is the RSA (Rivest-Shamir-Adleman) system, while the DES (Data Encryption Standard) system is a common example of the secret-key cryptosystem. In the RSA system as the public-key cryptosystem, when encrypting a plaintext M into a ciphertext C with the encryption key pair (e,n) and decryption key pair (d,n) where e, n is the public key and d is the secret key, the algorithm for encryption M and decryption E is expressed as $$C = E(M) = M^3 \pmod{n} \quad (1)$$

$$M = D(C) = C^d \pmod{n} \quad (2)$$

where n is the product of prime numbers p and q, and e and d are selected so that d and $(p-1)(q-1)$ do not have a common divisor and $e \cdot d = 1\{\bmod (p-1)(q-1)\}$.

In the DES system as the secret-key cryptosystem, on the other hand, a data scrambler and a key scrambler are used, and groups of 64 plaintext bits are each subjected to a combined process of transposition and substitution using a 56-bit key, to produce groups of 64 encrypted text bits; by performing the reverse process, each group of 64 encrypted text bits is decrypted into the original 64 plain text bits.

In the present invention, one or the other of the above two cryptosystems is appropriately selected for use.

In the present invention, when the personal communication terminal manufacturer or dealer ships or sells the personal communication terminals, a write key is written into each terminal before shipment or sale. When, at a later time, the user who purchased the personal communication terminal applies to the carrier for registration, the carrier transmits an encrypted identification number to the personal communication terminal which then automatically decrypts the identification number by using the write key and stores the decrypted number in memory without human intervention.

Figure 1:
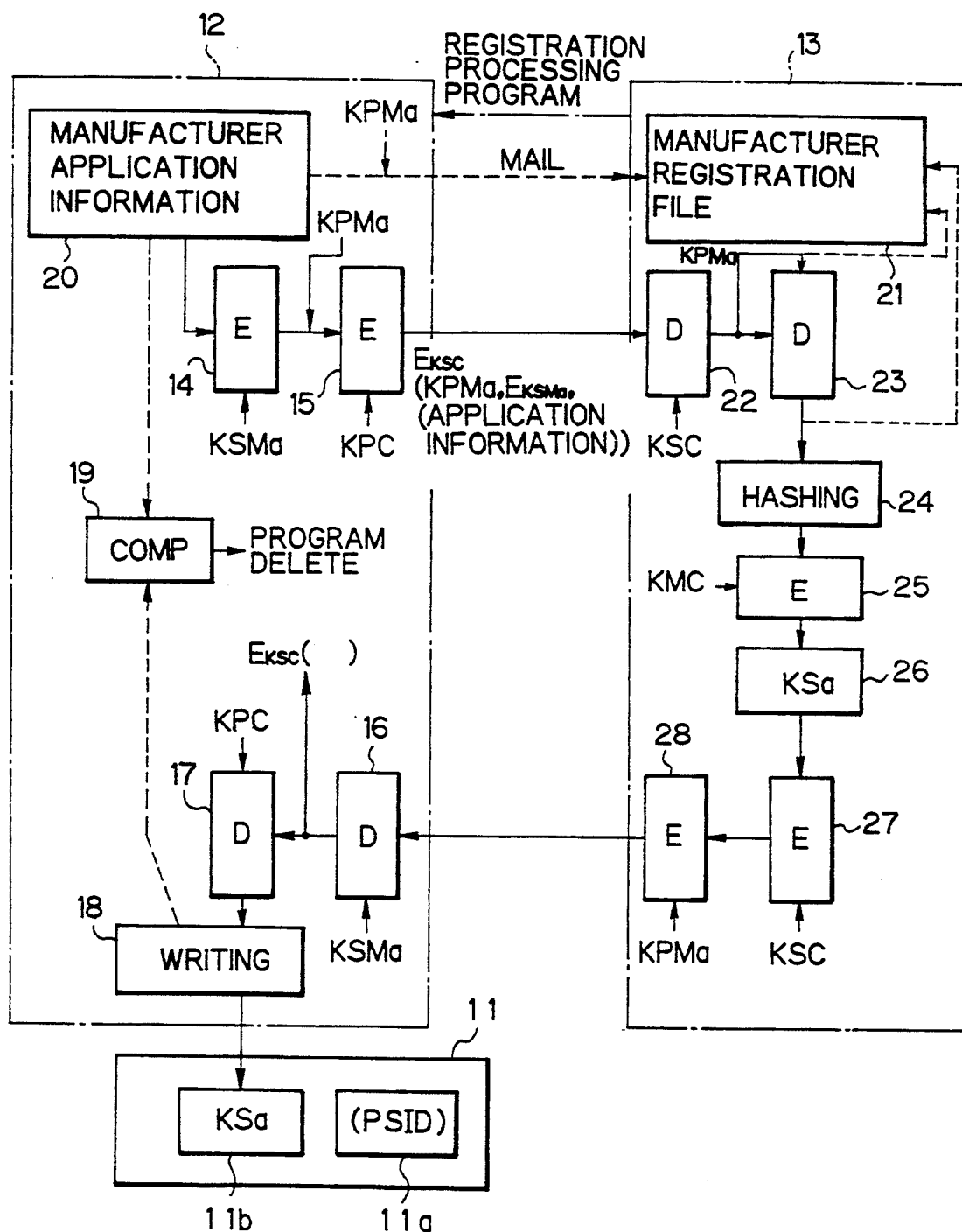
FIG. 1 is a block diagram showing a procedure for storing a write key according to an embodiment of the present invention.

FIG. 1 is a block diagram for explaining a registration procedure according to one embodiment of the invention, in which the carrier decides a write key KSa in accordance with an application from the manufacture or dealer, and the manufacturer equipment that received the write key writes it into the personal communication terminal.

The personal communication terminal 11, such as a car telephone or a portable telephone, equipped with a microprocessor and transmitting and receiving functions, contains an identification number storing section 11a for storing an identification number PSID and a write key storing section 11b for storing the write key KSa. The manufacturer equipment 12, which is constructed from a personal computer equipped with communication functions, is loaded with a registration processing program which implements encrypting sections (E) 14 and 15, decrypting sections (D) 16 and 17, a write processing section 18, and a comparator 19. Manufacturer's application information 20 is input to the manufacturer equipment A security service center 13 at the carrier (communications service carrier) includes a manufacturer registration file 21, decrypting sections (D) 22 and 23, a hashing section 24, encrypting sections (E) 25, 27, and 28, and a write key setting section 26.

The identification number storing section 11a and write key storing section 11b in the personal communication terminal 11 are constructed from a writable nonvolatile memory, such as a programmable read-only memory (PROM, EPROM, EEPROM), which is capable of retaining its contents after power is turned off. Furthermore, the identification number storing section 11a is so constructed that the identification number written at the time of registration is read from it when the personal communication terminal is in normal operation, but that the registered contents will be lost when it is disassembled, for example, thus making it impossible to read the identification number by accessing it from the outside. Such security features can be easily put into practice by those skilled in the art.

To receive the registration processing program that implements the functional blocks 14 to 19, the manufacturer or dealer either sends a person to the carrier to receive a floppy disk or a magnetic tape containing the program, or downloads the registration processing program from the security service center 13 by following the instructions the carrier gives in accordance with an application from the manufacturer or dealer. In the latter case, it is desirable that the registration processing program be transmitted after encrypting it in the aforementioned public-key cryptosystem using a public key.

The manufacturer decides on a public key KPMa for public-key encrypted communication and a secret key KSMa associated with the public key. The manufacturer then fills out an application form carrying entries for the public key KPMa, the signature and seal of the manufacturer's representative, and the application information, and sends the application to the carrier by mail or other means.

The manufacturer's application information 20 includes, for example, a serial number, center name, date of application, person in charge of application, the name, address, and telephone number of the manufacturer, product name, model name, starting date of service, etc. This manufacturer's application information is input to the manufacturer equipment 12 via a keyboard or a character reader, encrypted by the encrypting section 14 by using the secret key KSMa decided by the manufacturer, appended with the public key KPMa, and further encrypted by the encrypting section 15 by using the public key KPC supplied from the carrier. The encrypted text is therefore expressed as $E_{KPC}$ (KPMa, $E_{KSMa}$ (application information)).

When this encrypted application information is transmitted to the security service center 13 via a communication channel, the application information is decrypted by the decrypting section 22 by using the secret key KSC that the center holds, to recover the manufacturer's public key KPMa and encrypted text $E_{KSMa}$ (application information). The encrypted text $E_{KSMa}$ (application information) is decrypted by the decrypting section 23 by using the key KPMa to recover the application information. The carrier compares the thus recovered application information and KPMa with the application information and KPMa contained in the document received by mail; if they agree as a result of the comparison, then the manufacturer's application information is registered in the manufacturer registration file 21. In this manner, the application information is transmitted via secret communication with a signature for registration with the carrier without fail.

Further, the application information is hashed by the hashing section 24 as a result of which data is compressed to a prescribed length. The resulting data is encrypted by the encrypting section 25 by using a center master key KMC, and then set in the write key setting section 26 as a write key KSa. The write key KSa is thus determined uniquely according to the manufacturer's name and the product name, and even if a person exists who knows the contents of the application and the hashing algorithm used, it is not possible for such a person to access the contents of the write key KSa unless he knows the key KMC. The write key KSa and appended information are encrypted by the encrypting section 27 by using the carrier's secret key KSC, and are further encrypted by the encrypting section 28 by using the manufacturer's public key KPMa. The resulting encrypted text is expressed, for example, as $E_{KPMa}(E_{KSC}(KSa,$ serial number, center name, date, program delete code)). The serial number, center name, and date are contained in the manufacturer's application information. To these items, the program delete code is appended, for example, in the write key setting section 26.

The manufacturer equipment 12 receives the thus encrypted write key via the communication channel, and decrypts it in the decrypting section 16 by using the manufacturer's secret key KSMa. The $E_{KSC}(\ )$, along with the application information, is stored as an evidence code. In the decrypting section 17, decryption is performed using the public key KPC supplied from the carrier, to recover the write key KSa, serial number, center name, date, and program delete code. The decrypted contents are compared with the contents of the manufacturer's application information 20; if they agree, the write processing section 18 writes the write key KSa into the write key storing section 11 in the personal communication terminal 11, after which the entire registration processing program is deleted in accordance with the program delete code. In this manner, the write key KSa is transmitted from the carrier to the manufacturer via secret communication with a signature and is written into the personal communication terminal, after which the entire registration processing program is deleted. In the above process, the same write key KSa is written into all personal communication terminals 11 of the same model name in accordance with the manufacturer's application information. After the write key KSa has been written in, the personal communication terminals are allowed to be shipped or sold.

Figure 2:
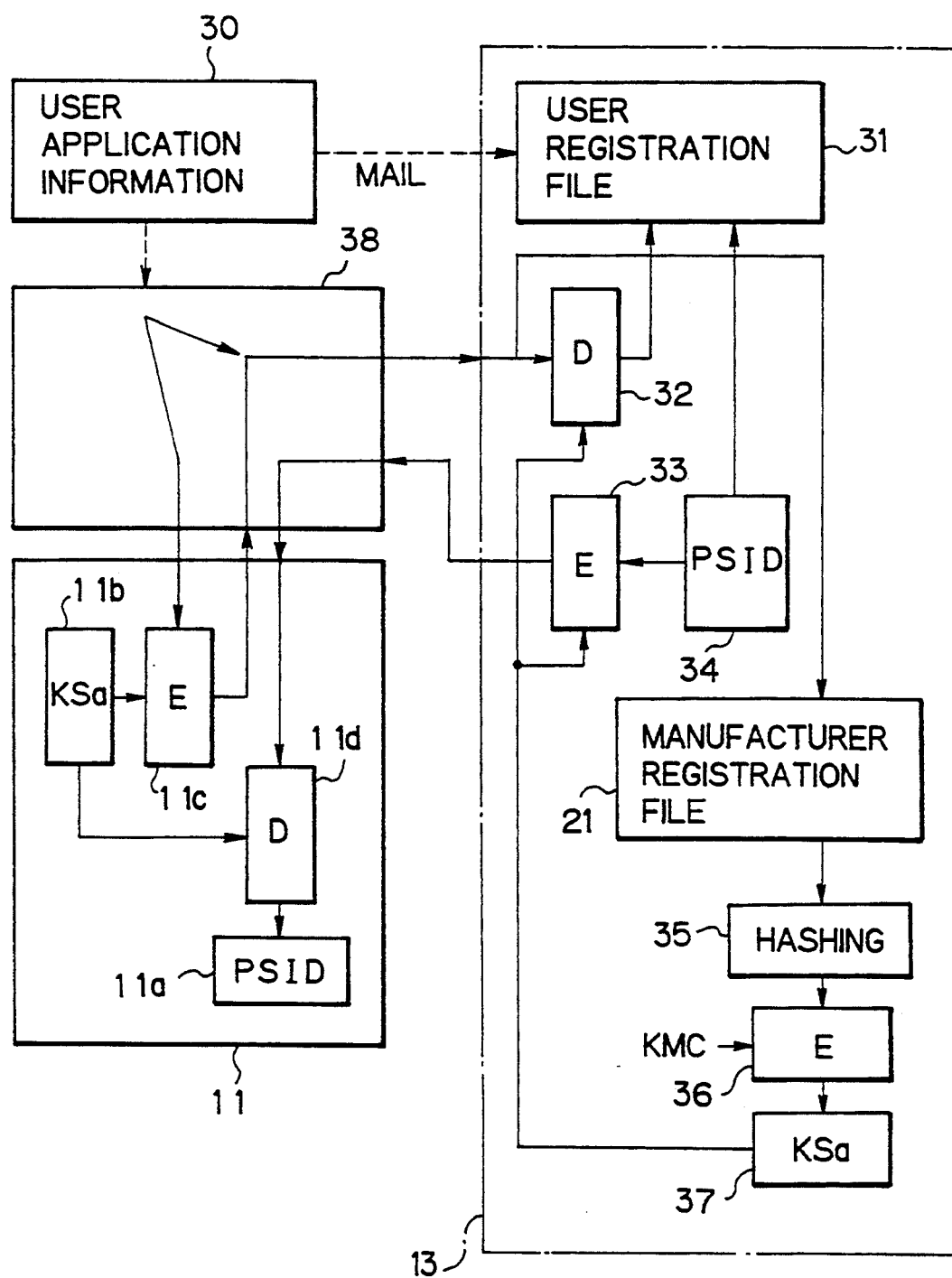
FIG. 2 is a block diagram showing a registration procedure according the embodiment of the present invention.

FIG. 2 is a block diagram for explaining a procedure in which the user who purchased the personal communication terminal 11 makes a request to the carrier for registration.

The personal communication terminal 11 includes an encrypting section (E) 11c and a decrypting section (D) 11d, in addition to the identification number storing section 11a and write key storing section 11b. The encrypting section 11c and the decrypting section 11d perform encryption and decryption using the same secret key KSa in accordance with the DES system. If the terminal is one that already contains encryption and decryption circuitry for secret communication, such circuitry can be substituted. The security service center 13 contains the manufacturer registration file 21, a user registration file 31, a decrypting section (D) 32, an encrypting section (E) 33, an identification number generating section 34, a hashing section 35, and an encrypting section (E) 36.

The user who purchased the personal communication terminal 11 fills out a user application form 30. The user application form 30 carries, for example, such entries as the serial number, center name, date of application, the name, address, and telephone number of the applicant, name of manufacturer, product name, model name, the signature and seal of the user, etc. The user then mails this user application form 30 to the carrier or the security service center 13 specified by the manufacturer. After that, the user connects his personal communication terminal 11 to equipment 38, enters user's application information via a keyboard or a character reader, and connects the equipment 38 via a communication channel to the security service center 13 specified by the manufacturer. The user's application information is encrypted by the encrypting section 11c by using the write key KSa held in the write key storing section 11b in the personal communication terminal 11, and the encrypted text $E_{KSa}$ (user's application information) is transmitted to the security service center 13 together with the original plaintext of the user's information.

The security service center 13 receives the plaintext of user's application information and its encrypted version $E_{KSa}$ (user's application information), separates the plaintext of user's application information, and retrieves the manufacturer's application information by searching through the manufacturer registration file 21 by reference to the manufacturer's name, serial number, etc. The retrieved manufacturer's application information is then hashed by the hashing section 35, and encrypted by the encrypting section 36 by using the center master key KMC, to generate a write key KSa which is set in the write key setting section 37. A write key identical to the originally created one is thus generated by following a similar process to the one described in FIG. 1 in which the write key KSa was generated using the center master key KMC by processing through the hashing section 25 and encrypting section 26.

Using the thus generated write key KSa, the decrypting section 32 decrypts the encrypted text $E_{Ksa}$ (user's application information), and compares the decrypted user's application information with the contents carried in the user application form 30; if they agree as a result of the comparison, the identification number generating section 34 generates an identification number corresponding to the user, and the user information and the identification number PSID are registered in the user registration file 31. The identification number PSID is also encrypted by the encrypting section 33 by using the write key KSa, and transmitted to the equipment 38.

The personal communication terminal 11 applies the encrypted text $E_{KSa}$ (PSID), received from the security service center 13 via the equipment 38, to the decrypting section 11d which then decrypts it by using the write key KSa held in the write key storing section 11b. The decrypted identification number PSID is written into the identification number storing section 11a. The personal communication terminal 11 is now ready to access the communications service provided by the carrier. During the process leading up to the registration of the identification number PSID, no information is transmitted which allows anyone to figure out the identification number PSID, and not a single occasion occurs in which the operator or anyone else can recognize the identification number PSID. This eliminates the possibility of unauthorized use of the identification number PSID.

In the above embodiment, the manufacturer's application information and the write key are transmitted in encrypted form by using a public-key cryptosystem between the manufacturer equipment 12 and the security service center 13, while between the security service center 13 and the dealer or user equipment 38, the user's application information and the identification number are transmitted in encrypted form by using a secret-key cryptosystem. While this method rather complicates the encryption and decryption operations in the manufacturer equipment 12, the secrecy of the write key can be increased, and the size and cost of the dealer or user equipment 38 can be reduced by simplifying the encryption and decryption operations in the equipment 38 as compared to cases in which the public-key cryptosystem is used. It will be recognized that both the write key and the identification number may be transmitted using the same cryptosystem. Furthermore, sending the application by mail, etc., may be omitted.

In the above embodiment, the dealer or user equipment 38 is used to communicate with the security service center 13 so that the identification number PSID transmitted from the security service center 13 is registered in the personal communication terminal 11. As an alternative, the communication function of the personal communication terminal 11 the user purchased may be used to communicate with the security service center 13 to have the identification number PSID registered in the same procedure as described above.

As described, in the above embodiment, the secret key KSa written in the terminal is identical for all terminals of the same model from the same manufacturer. Therefore, if the value of KSa leaks out by any chance, all terminals of the same model of the same manufacturer would be affected. A second embodiment of the present invention is one that improves on this point.

Figure 3:
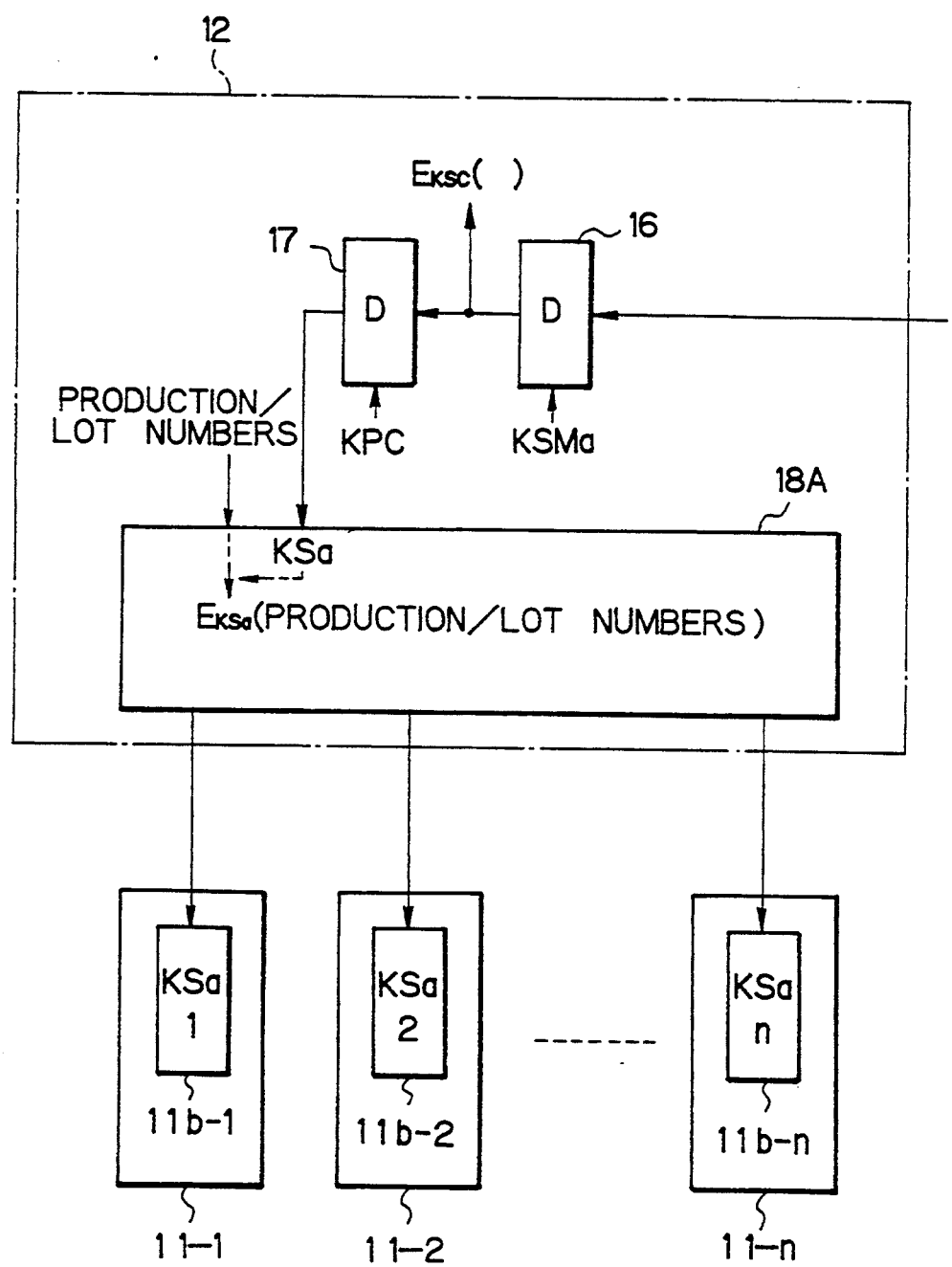
FIG. 3 is a block diagram showing a procedure for storing a write key according to another embodiment of the present invention.

FIG. 3 is a block diagram for explaining a procedure for writing a write key according to the second embodiment of the invention. In the example shown, the write keys written in personal communication terminals at the manufacturer are different according to the production number, lot number, etc. The reference numerals 11-1 to 11-n designate personal communication terminals each representing terminals grouped together according to their production/lot numbers, 12 indicates manufacturer equipment, 16 and 17 refer to decrypting sections (D), and 18A denotes a write processing section.

As in the first embodiment shown in FIG. 1, the encrypted text $E_{KPMa}$ ($E_{KSC}$(serial number, KSa, center name, date, program delete code)), which contains the write key KSa, is transmitted from the security service center in accordance with the manufacturer's application information. In the manufacturer equipment 12, this encrypted text is decrypted by the decrypting section 16 by using the manufacturer's secret key KSMa, and the $E_{KSC}$( ) recovered from the output of the decrypting section 16 is stored as an evidence code along with the manufacturer's application information. The output of the decrypting section 16 is also fed to the decrypting section 17 for decryption with the center public key KPC, and the recovered plaintext (serial number, KSa, center name, date) is supplied to the write processing section 18A.

Production/lot numbers are input to the write processing section 18A for encryption (E) with the write key KSa to generate $E_{KSa}$(production/lot numbers), which is written into the write key storing sections, 11b-1 to 11b-n, in the personal communication terminals, 11-1 to 11-n, as different write keys, KSa1 to KSan, corresponding to the respective production/lot numbers. The personal communication terminals, 11-1 to 11-n, with respective write keys written therein, are shipped from the manufacturer. With this arrangement, if the write key written in the terminals in a certain production lot leaks out by any chance, the write keys written in the terminals in other lots can be kept secure.

Figure 4:
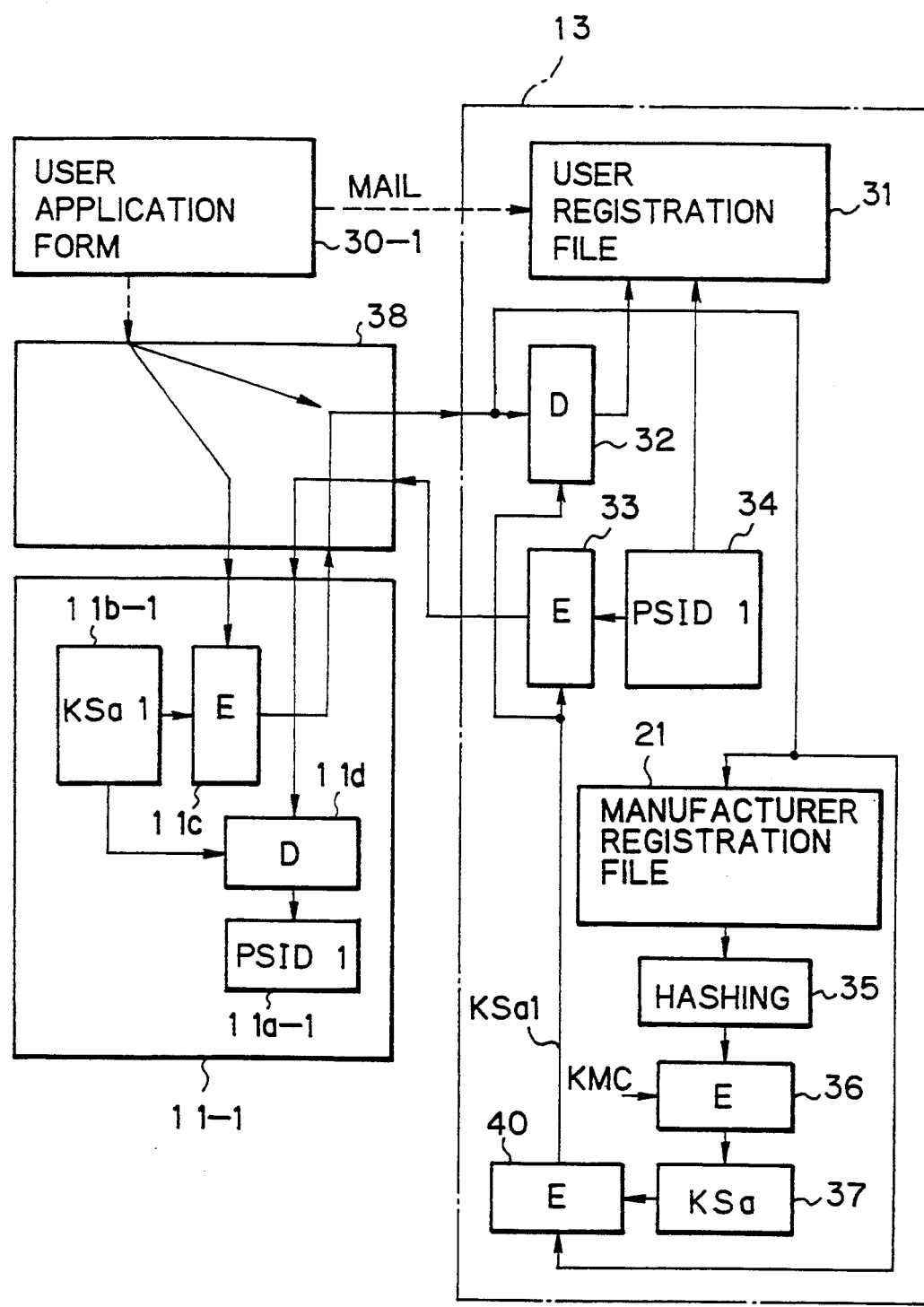
FIG. 4 is a block diagram showing a registration procedure according to the embodiment of the present invention.

FIG. 4 is a block diagram for explaining a procedure for registering an identification number according to the second embodiment of the invention. The illustrated example shows a procedure for registering an identification number PSID1 in the personal communication terminal 11-1. The reference numeral 11a–1 is an identification number storing section, 11b–1 is a write key storing section, 30-1 is a user application form, and 40 is an encrypting section; the same reference numerals as those used in FIGS. 2 and 3 designate the component elements having the same functions as those described in the previous figures.

The user who purchased the personal communication terminal 11-1 fills out the user application form 30-1 carrying such entries as serial number, center name, application date, the name, address, and telephone number of the applicant, manufacturer's name, product name, model name, production number/lot number, the signature and seal of the user, etc., and mails the application to the carrier or the security service center 13. After that, the user or dealer connects the personal communication terminal 11-1 to the equipment 38, enters the user's application information as carried in the user application form 30-1 via a keyboard or the like, and connects the equipment 38 to the security service center 13 via a communication channel. Before transmission to the security service center 13, the user application information is encrypted by the encrypting section 11c by using the write key KSa1 stored in the write key storing section 11b-1 in the personal communication terminal 11-1. As in the case of the first embodiment, the encrypted text $E_{KSa1}$ (user's application information) is transmitted along with the original plaintext (user's application information).

The security service center 13 separates the plaintext (user's application information), and searches through the manufacturer registration file 21 by reference to the manufacture's name, serial number, etc., to retrieve the manufacture's application information. The retrieved manufacturer's application information is hashed by the hashing section 35, and encrypted by the encrypting section 36 by using the center master key KMC to generate a write key KSa which is set in the write key setting section 37. In the meantime, the production/lot numbers are separated from the plaintext (user's application information) and applied to the encrypting section 40 for encryption with the write key KSa. With this process, the same key as any of the write keys KSa1 to KSan written in the personal communication terminals 11-1 to 11-n by the manufacture equipment 12 according to the production/lot numbers can be generated. For the personal communication terminal 11-1, the write key KSa1 which is identical to the write key KSa1 originally written therein is generated.

Using the thus generated write key KSa1, the decrypting section 32 decrypts the encrypted text Eksa1 (user's application information), and compares the decrypted contents with the contents carried in the user application form 30-1 received by mail; if they agree as a result of the comparison, the identification number generating section 34 generates an identification number PSID1 corresponding to the user, and the user's information and the corresponding identification number are registered in the user registration file 31. The identification number PSID1 is also encrypted by the encrypting section 33 by using the write key KSa1, and transmitted to the equipment 38.

The equipment 38 transfers the encrypted text $E_{KSa1}$ (PSID1) to the personal communication terminal 11-1 where the text is decrypted by the decrypting section 11d by using the write key KSa1 stored in the write key storing section 11b-1. The decrypted identification number PSID1 is written into the identification number storing section 11a-1. In this embodiment, the same write key is assigned to the same manufacturer, but different write keys can be stored in personal communication terminals having different production and lot numbers, for increased security.

We claim:

1. A method of registering an identification number in a personal communication terminal to enable it to access communications services provided by a carrier, comprising the steps of:
   a) storing a first key in a secret manner into the personal communication terminal before the communication terminal is sold to a user;
   b) receiving an identification number encrypted with a second key associated with the first key from the carrier, after the personal communication terminal is sold to the user;
   c) decrypting the encrypted identification number in a secret manner within the personal communication terminal by using the first key from the carrier; and
   d) storing the decrypted identification number in a secret manner into the personal communication terminal, wherein the step a) includes the substeps of:
      i) inputting manufacturer application information to manufacturer equipment;
      ii) transmitting the input manufacturer application information from the manufacturer equipment to carrier equipment;
      iii) automatically generating the first key corresponding to the manufacturer information in the carrier equipment;
      iv) automatically transmitting the generated first key from the carrier equipment to the manufacturer equipment; and
      v) automatically storing the first key received from the carrier equipment into the personal communication terminal, in the manufacturer equipment.

2. A method as claimed in claim 1, wherein in the substep ii) the manufacturer application information is transmitted through a secret communication with a signature according to a public-key cryptosystem.

3. A method as claimed in claims 2, wherein in the substep ii) a document including the manufacture application information is further transmitted, and the manufacturer application information included in the document is compared with the manufacturer application information transmitted through the first secret communication with a signature, in the carrier equipment.

4. A method as claimed in claim 1, wherein the substep iii) includes the substeps of
   hashing the manufacturer information to make data having a prescribed length, and
   encrypting the data using a master key to generate the first key.

5. A method as claimed in claim 1, wherein in the substep iv) the first key is transmitted through a secret communication with a signature according to a public-key cryptosystem.

6. A method as claimed in claim 5, wherein in the substep iv) a part of the manufacturer information is further transmitted from the carrier equipment to the manufacturer equipment through the secret communication with a signature, and the part of the manufacturer information is compared with a corresponding part of the manufacturer information input in the substep i).

7. A method of registering an identification number in a personal communication terminal to enable it to access communications services provided by a carrier, comprising the steps of:
   a) storing a first key in a secret manner into the personal communication terminal before the communication terminal is sold to a user;
   b) receiving an identification number encrypted with a second key associated with the first key from the carrier, after the personal communication terminal is sold to the user;
   c) decrypting the encrypted identification number in a secret manner within the personal communication terminal by using the first key from the carrier; and
   d) storing the decrypted identification number in a secret manner into the personal communication terminal, wherein the step b) includes the substeps of:
      i) inputting user application information to user equipment;
      ii) transmitting the input user application information to carrier equipment, said user application information being encrypted with the first key in the personal communication terminal and the encrypted user application information being decrypted with the second key equipment in the carrier equipment a document including the user application information being further transmitted, and the user application information included in the document being compared with the decrypted user application information;
      iii) automatically transmitting the encrypted identification number to the user equipment;
      iv) automatically generating the identification number corresponding to the user;
      v) automatically encrypting the identification number with the second key; and
      vi) automatically transmitting the encrypted identification number to the user equipment.

8. A method as claimed in claim 7, wherein the substep iii) includes the substeps of
   searching for manufacturer application information stored in the carrier equipment by reference to the user application information to retrieve manufacturer application information corresponding to the user application information,
   hashing the retrieved manufacturer application information to make data having a prescribed length, and
   encrypting the data using a master key to generate the second key.

9. A method of registering an identification number in a personal communication terminal to enable it to access communications services provided by a carrier, comprising the steps of:
   a) storing a first key in a secret manner into the personal communication terminal before the communication terminal is sold to a user;
   b) receiving an identification number encrypted with a second key associated with the first key from the carrier, after the personal communication terminal is sold to the user;

c) decrypting the encrypted identification number in a secret manner within the personal communication terminal by using the first key from the carrier; and d) storing the decrypted identification number in a secret manner into the personal communication terminals, wherein the step a) includes the substep of:

i) inputting manufacturer application information to manufacturer equipment;

ii) transmitting the input manufacturer application information from the manufacturer equipment to carrier equipment;

iii) automatically generating a third key corresponding to the manufacturer information in the carrier equipment;

iv) automatically transmitting the generated third key from the carrier equipment to the manufacturer equipment;

v) automatically encrypting a number corresponding to the personal communication terminal with the third key received from the carrier equipment to generate the first key; and vi) automatically storing the generated first key into the personal communication terminal.

10. A method as claimed in claim 9, wherein in the substep ii) the manufacturer application information is transmitted through a secret communication with a signature according to a public-key cryptosystem.

11. A method as claimed in claim 10, wherein in the substep ii) a document including the manufacture application information is further transmitted, and the manufacturer application information included in the document is compared with the manufacturer application information transmitted through the first secret communication with a signature, in the carrier equipment.

12. A method as claimed in claim 9, wherein the substep iii) includes the substeps of
hashing the manufacturer information to make data having a prescribed length, and
encrypting the data using a master key to generate the third key.

13. A method as claimed in claim 9, wherein in the substep iv) the third key is transmitted through a secret communication with a signature according to a public-key cryptosystem.

14. A method as claimed in claim 13, wherein in the substep iv) a part of the manufacturer information is further transmitted from the carrier equipment to the manufacturer equipment through the secret communication with a signature, and the part of the manufacturer information is compared with a corresponding part of the manufacturer information input in the substep i).

15. A method as claimed in claim 9, wherein the step b) includes the substeps of:

i) inputting user application information to user equipment;

ii) transmitting the input user application information to carrier equipment;

iii) automatically generating the second key corresponding to the user information in the carrier equipment;

iv) automatically generating the identification number corresponding to the user;

v) automatically encrypting the identification number with the second key; and vi) automatically transmitting the encrypted identification number to the user equipment.

16. A method as claimed in claim 15, wherein in the substep ii), the user application information is encrypted with the first key in the personal communication terminal and the encrypted user application information is decrypted with the second key in the carrier equipment.

17. A method as claimed in claim 16, wherein in the substep ii) a document including the user application information is further transmitted, and the user application information included in the document is compared with the decrypted user application information.

18. A method as claimed in claim 15, wherein the substep iii) includes the substeps of
searching for manufacturer application information stored in the carrier equipment by reference to the user application information to retrieve manufacturer application information corresponding to the user application information,
hashing the retrieved manufacturer application information to make data having a prescribed length,
encrypting the data using a master key to generate a fourth key, and
encrypting a number included in the user application information to generate the second key.

19. A method of storing a key into a personal communication terminal, the key being to be used for decrypting an encrypted identification number in order to store the identification number into the personal communication terminal to enable it to access communications services provided by a carrier, comprising the steps of:

i) inputting manufacturer application information to manufacturer equipment;

ii) transmitting the input manufacture application information from the manufacturer equipment to carrier equipment;

iii) automatically generating the key corresponding to the manufacturer information in the carrier equipment;

iv) automatically transmitting the generated key from the carrier equipment to the manufacturer equipment; and v) automatically storing the key received from the carrier equipment into the personal communication terminal, in the manufacturer equipment.

20. A method as claimed in claim 19, wherein in the step ii) the manufacturer application information is transmitted through a secret communication with a signature according to a public-key cryptosystem.

21. A method as claimed in claim 20, wherein in the step ii) a document including the manufacture application information is further transmitted, and the manufacturer application information included in the document is compared with the manufacturer application information transmitted through the first secret communication with a signature, in the carrier equipment.

22. A method as claimed in claim 19, wherein the step iii) includes the substeps of
hashing the manufacturer information to make data having a prescribed length, and
encrypting the data using a master key to generate the key.

23. A method as claimed in claim 19, wherein in the step iv) the key is transmitted through a secret communication with a signature according to a public-key cryptosystem.

24. A method as claimed in claim 23, wherein in the step iv) a part of the manufacturer information is further transmitted from the carrier equipment to the manufacturer equipment through the secret communication with a signature, and the part of the manufacturer information is compared with a corresponding part of the manufacturer information input in the step i).

* * * * *